US012747851B2

(12) United States Patent
Li et al.

(10) Patent No.: US 12,747,851 B2
(45) Date of Patent: Sep. 29, 2026

(54) SHOE BOX LAMP

(71) Applicant: Torshare Ltd., Shenzhen (CN)

(72) Inventors: Mantie Li, Shenzhen (CN); Yiye Liu, Shenzhen (CN); Jian Peng, Shenzhen (CN); Liang Chen, Shenzhen (CN); Qi Chen, Shenzhen (CN)

(73) Assignee: Torshare Ltd., Shenzhen (CN)

(*) Notice: Subject to any disclaimer, the term of this patent is extended or adjusted under 35 U.S.C. 154(b) by 0 days.

(21) Appl. No.: 19/289,961

(22) Filed: Aug. 4, 2025

(65) Prior Publication Data

US 2026/0063276 A1 Mar. 5, 2026

(30) Foreign Application Priority Data

Sep. 2, 2024 (CN) ......................... 202411222594.0
Jul. 9, 2025 (CN) ......................... 202510949326.7

(51) Int. Cl.

| | |
|---|---|
| ***F21S 9/02*** | (2006.01) |
| ***F21V 14/06*** | (2006.01) |
| ***F21V 17/18*** | (2006.01) |
| ***F21V 23/00*** | (2015.01) |
| ***F21V 23/04*** | (2006.01) |
| ***F21V 29/76*** | (2015.01) |
| ***F21V 31/00*** | (2006.01) |
| ***F21V 31/03*** | (2006.01) |
| *F21W 131/103* | (2006.01) |
| *F21Y 115/10* | (2016.01) |

(52) U.S. Cl.
CPC ................ *F21V 14/06* (2013.01); *F21S 9/02* (2013.01); *F21V 17/18* (2013.01); *F21V 23/002* (2013.01); *F21V 23/0464* (2013.01); *F21V 29/763* (2015.01); *F21V 31/005* (2013.01); *F21V 31/03* (2013.01); *F21W 2131/103* (2013.01); *F21Y 2115/10* (2016.08)

(58) Field of Classification Search
CPC ........... F21S 9/02; F21V 17/18; F21V 31/005
USPC .......................................................... 362/257
See application file for complete search history.

(56) References Cited

U.S. PATENT DOCUMENTS

2015/0146444 A1* 5/2015 Ovenshire .............. E05B 81/76
362/497

* cited by examiner

*Primary Examiner* — Toan C Ly
(74) *Attorney, Agent, or Firm* — Westbridge IP LLC

(57) ABSTRACT

A shoe box lamp includes a first shell provided with a plurality of installation positions; a second shell detachably connected to one side of the first shell; a light source fixedly installed between the first shell and the second shell; and a lens provided on one side of the light source close to the second shell. The lens is configured to be adjusted between the plurality of installation positions; and when the lens is in different installation positions, light from the light source is configured to emit different light spots through the lens.

17 Claims, 6 Drawing Sheets

SHOE BOX LAMP

CROSS-REFERENCE TO RELATED APPLICATIONS

The present application claims priority to Chinese Patent Application No. 202411222594.0, filed on Sep. 2, 2024, and Chinese Patent Application No. 202510949326.7, filed on Jul. 9, 2025. The disclosures of the above-mentioned applications are hereby incorporated by reference in their entireties.

TECHNICAL FIELD

The present application relates to the technical field of lamps, and in particular to a shoe box lamp.

BACKGROUND

Light emitting diode (LED) lamps are made of a piece of electroluminescent semiconductor material chip, which is cured on a bracket with silver glue or white glue, and is connected to the chip and the circuit board through the silver wire or gold wire. The chip is sealed with epoxy resin around to protect the internal core wire, and is finally installed with a shell to make a variety of lamps with different functions. LED lamps have good seismic resistance, so they are also often used in street lamps. Because of their shape similar to shoe boxes, they are also called as shoe box lamps. In the related art, the shoe box lamp can emit a variety of different light types by changing the lens, but the operation of changing the light type is too cumbersome and the efficiency of adjusting the light type is not high.

SUMMARY

The main purpose of the present application is to provide a shoe box lamp, aiming to improve the efficiency of adjusting the light type of the shoe box lamp.

To achieve the above purpose, the shoe box lamp provided in the present application includes:

a first shell provided with a plurality of installation positions;

a second shell detachably connected to one side of the first shell;

a light source fixedly installed between the first shell and the second shell; and a lens provided on one side of the light source close to the second shell;

the lens is configured to be adjusted between the plurality of installation positions; and when the lens is in different installation positions, light from the light source is configured to emit different light spots through the lens.

In an embodiment, the shoe box lamp further includes a locking structure, and one end of the first shell is rotatably connected to one end of the second shell; and the other end of the first shell is detachably connected to the other end of the second shell through the locking structure.

In an embodiment, the locking structure includes:

a latch installed at the second shell and provided with a buckle position and a natural position; and a buckle installed at the second shell and provided with a lock position and an unlock position;

when in the buckle position, the latch is configured to cover the second shell at the first shell and limit the first shell; and when in the natural position, the latch is configured to release the limit to the first shell so that the second shell is separated from the first shell; and when in the lock position, the buckle is configured to lock the latch in the buckle position; and when in the unlock position, the latch is configured to switch to the natural position.

In an embodiment, the latch is provided with a fixed shaft, a connection end and a locking end are provided at both sides of the fixed shaft, and the fixed shaft is rotatably connected to the second shell;

the connection end is cooperated with and connected to the first shell, and the locking end is cooperated with and connected to the buckle;

a first through hole is provided at a position of the second shell corresponding to the connection end, and a second through hole is provided at a position of the first shell corresponding to the first through hole;

when the latch is in the buckle position, the connection end is configured to simultaneously pass through the first through hole and the second through hole and abut against one side of the first shell away from the second shell; and the latch is further provided with a first elastic member configured to drive the buckle to switch from the buckle position to the natural position.

In an embodiment, the buckle is configured to switch from the lock position to the unlock position under an action of an external force, and the buckle is provided with a second elastic member configured to switch the buckle from the unlock position to the lock position.

In an embodiment, two latches are provided opposite to each other, locking ends of the two latches are abutted against the buckle at the same time, and at least one of the two latches is provided with a locking member configured to limit the latch to the lock position.

In an embodiment, the locking member is configured to pass through the latch and is rotatably connected to the second shell, and the locking member is configured to unlock the latch by rotating.

In an embodiment, a positioning column is provided at one side of the first shell facing the second shell, a plurality of positioning holes are provided at intervals at the lens, each of the positioning holes corresponds to one of the installation positions, and the positioning column is configured to be inserted into the positioning hole to limit the lens to one of the installation positions.

In an embodiment, the lens includes a plurality of light-emitting covers provided in a matrix and in groups, each group of the light-emitting covers is provided with a different refraction angle, and the light source is configured to present different light emitting effects through the light-emitting covers to transmit different light spots.

In an embodiment, the shoe box lamp further includes a power member, the first shell includes a power compartment and a lamp box provided at intervals, the light source and the lens are installed in the lamp box, and the power member is installed in the power compartment; and the power compartment is connected to the lamp box through a connection portion, the connection portion is provided with a heat isolation groove, and an outer wall of the lamp box is provided with a heat dissipate piece.

In an embodiment, the power compartment is provided with an installation cavity opened towards one side and a cover body configured for covering an opening of the installation cavity, and the power member is installed in the installation cavity;

one end of the cover body is rotatably connected to the power compartment, and the other end of the cover body is provided with a press buckle; and an outer wall of the power compartment is provided with a limit portion cooperated with the press buckle, and the cover body is detachably connected to the power compartment through the press buckle and the limit portion.

In an embodiment, a sidewall of the power compartment is provided with a wire groove, the wire groove is provided with an opening opened outward and a groove bottom wall opposite to the opening, and the groove bottom wall is provided with a through hole for a wire to pass through; and the first shell further includes a cover plate and a waterproof member, the waterproof member is sleeved at an outer wall of the wire and is abutted against an inner wall of the through hole, the cover plate is provided with an avoidance hole for the wire to pass through, and the cover plate is provided to cover the opening.

In an embodiment, one side of the power compartment close to the lamp box is provided with a first sidewall, and one side of the lamp box close to the power compartment is provided with a second sidewall;

one end of the connection portion is connected to the first sidewall, and the other end of the connection portion is connected to the second sidewall;

a plurality of heat dissipate pieces are at intervals along the first direction, each of the heat dissipate pieces is configured to extend along the second direction, and the heat dissipate piece is provided with a first end and a second end; and the first end is connected to the first sidewall, and a height of a top of the heat dissipate piece is configured to decrease from the first end towards the second end.

In an embodiment, the power compartment is provided with a first top wall, and the lamp box is provided with a second top wall; and the first top wall is higher than the second top wall, and the heat dissipate piece is provided at the second top wall.

In an embodiment, the power compartment is provided with an opening opened towards a side away from the first top wall; and the first shell further includes a cover body covering the opening, the cover body is provided with a balance hole, and fluid in the power compartment is configured to flow out through the balance hole.

In an embodiment, the first shell further includes a one-way joint provided at the balance hole, and the one-way joint is configured to limit the fluid flowing out of the power compartment in one direction.

In an embodiment, the shoe box lamp further includes a sensor configured to sense environmental changes so that the shoe box lamp is configured to change a brightness according to environmental changes.

In the technical solution of the present application, the first shell and the second shell are provided in the shoe box lamp, and the light source and the lens are provided between the first shell and the second shell, so that the light source and the lens are limited in the first shell through the second shell. The plurality of installation positions are provided in the first shell, and the lens can be adjusted between the plurality of installation positions. The lens can be adjusted to different positions by only translating the lens to different installation positions. When the lens is in different installation positions, the light emitted by the light source emits different light spots through the lens, so that the lens position is adjusted according to different application scenarios, so that the shoe box lamp emits different light types.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
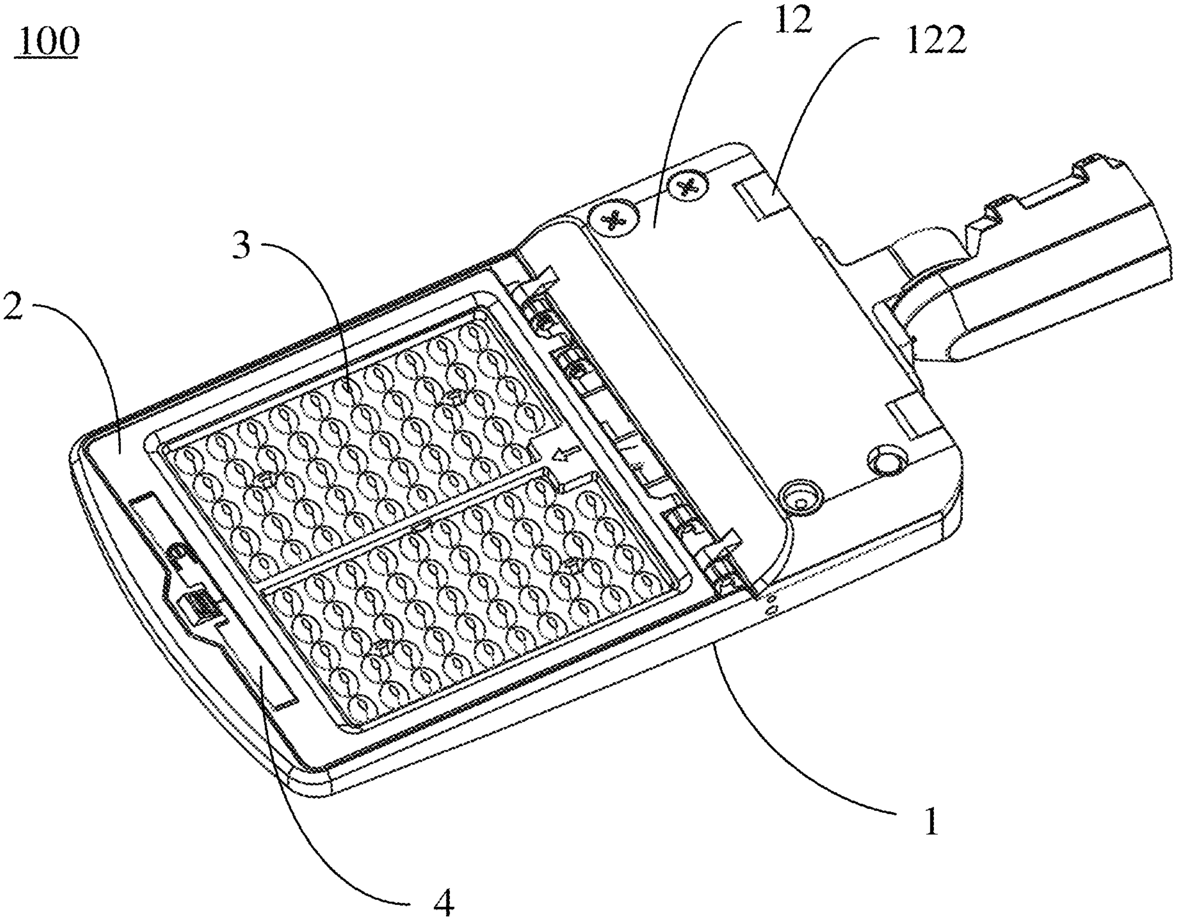
FIG. 1 is a schematic structural view of a shoe box lamp according to an embodiment of the present application.

The realization of the objective, functional characteristics, and advantages of the present application are further described with reference to the accompanying drawings.

DETAILED DESCRIPTION OF THE EMBODIMENTS

The technical solutions of the embodiments of the present application will be described in more detail below with reference to the accompanying drawings. It is obvious that the embodiments to be described are only some rather than all of the embodiments of the present application. All other embodiments obtained by those skilled in the art based on the embodiments of the present application without creative efforts shall fall within the scope of the present application.

It should be noted that if there are directional indications, such as up, down, left, right, front, back, etc., involved in the embodiments of the present application, the directional indications are only used to explain a certain posture as shown in the accompanying drawings. If the specific posture changes, the directional indication also changes accordingly.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of these features. Besides, the meaning of "and/or" or "or/and" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The present application provides a shoe box lamp 100.

Referring to FIG. 1 to FIG. 7, in an embodiment of the present application, the shoe box lamp 100 includes: a first shell 1, a second shell 2, a light source and a lens 3. The second shell 2 is detachably connected to one side of the first shell 1, and the light source is fixedly installed between the first shell 1 and the second shell 2. The lens 3 is provided on a side of the light source close to the second shell 2, the first shell 1 is provided with a plurality of installation positions, and the lens 3 can be adjusted in the installation position between the plurality of installation positions. When the lens 3 is in different installation positions, the light emitted by the light source emits different light spots through the lens 3.

In this embodiment, one side of the first shell 1 is rotatably connected to one side of the second shell 2, and the other side of the first shell 1 is detachably connected to the other side of the second shell 2 through a connection structure, so that the second shell 2 forms a flip cover structure and covers the first shell 1. The light source is fixedly installed between the first shell 1 and the second shell 2, and the lamp can be fixedly installed on the first shell 1 through the threaded fastener or bonding. A plurality of beads are provided at the light source to make the light spot more uniform, and the shape of the light spot can be changed through the arrangement of the beads. The lens 3 is provided on the side of the light source close to the second shell 2. A light-emitting hole is provided in the middle of the second shell 2 so that light can pass through the light-emitting hole to illuminate a light spot. The outer contour of the lens 3 is larger than the size of the light-emitting hole, so that the lens 3 will not fall out of the light-emitting hole. An installation groove is provided at the side of the first shell 1 towards the second shell 2. The installation groove can accommodate the lens 3. A plurality of installation positions are provided at intervals in the installation groove. In order to save the volume of the shoe box lamp 100, the plurality of installation positions can be partially overlapped without affecting the light emitting effect. As long as the lens 3 switches the installation position, the light emitted by the light source can emit different light spots through the lens 3.

In this embodiment, the first shell 1 is specifically provided with three installation positions, respectively the first installation position, the second installation position and the third installation position. When the lens 3 is provided at the first installation position, the light type emitted is the first light type, and the light spot of the first light type is roughly flat and elliptical. The refracted light is relatively concentrated, has a strong brightness, and is suitable for roads. When the lens 3 is provided at the second installation position, the light type emitted is the second light type. One side of the light spot of the second light type has relatively concentrated light and the other side of the light spot of the second light type has relatively broad light, and is suitable for lighting conditions that require a certain width and a certain intensity. When the lens 3 is provided at the third installation position, the light type emitted is the third light type. The light spot of the third light type has the largest light range, which can refract the light spot with the largest range, and is suitable for lanes.

In the technical solution of the present application, the first shell 1 is provided at the shoe box lamp 100 and configured to provide an installation position for the light source and the lens 3. The second shell 2 is detachably connected to one side of the first shell 1 so that the second shell 2 covers the light source and the lens 3, and the light source and the lens 3 are limited to the first shell 1 to avoid falling. The plurality of installation positions are provided in the first shell 1, so that the lens 3 can be adjusted to different positions by simply switching to the installation position by translation. When the lens 3 is in different installation positions, the light emitted by the light source emits different light spots through the lens 3, so that the operator can adjust the position of the lens 3 according to different application scenarios by simply switching the lens 3 to different installation positions, and the shoe box lamp 100 can emit different light types.

Figure 2:
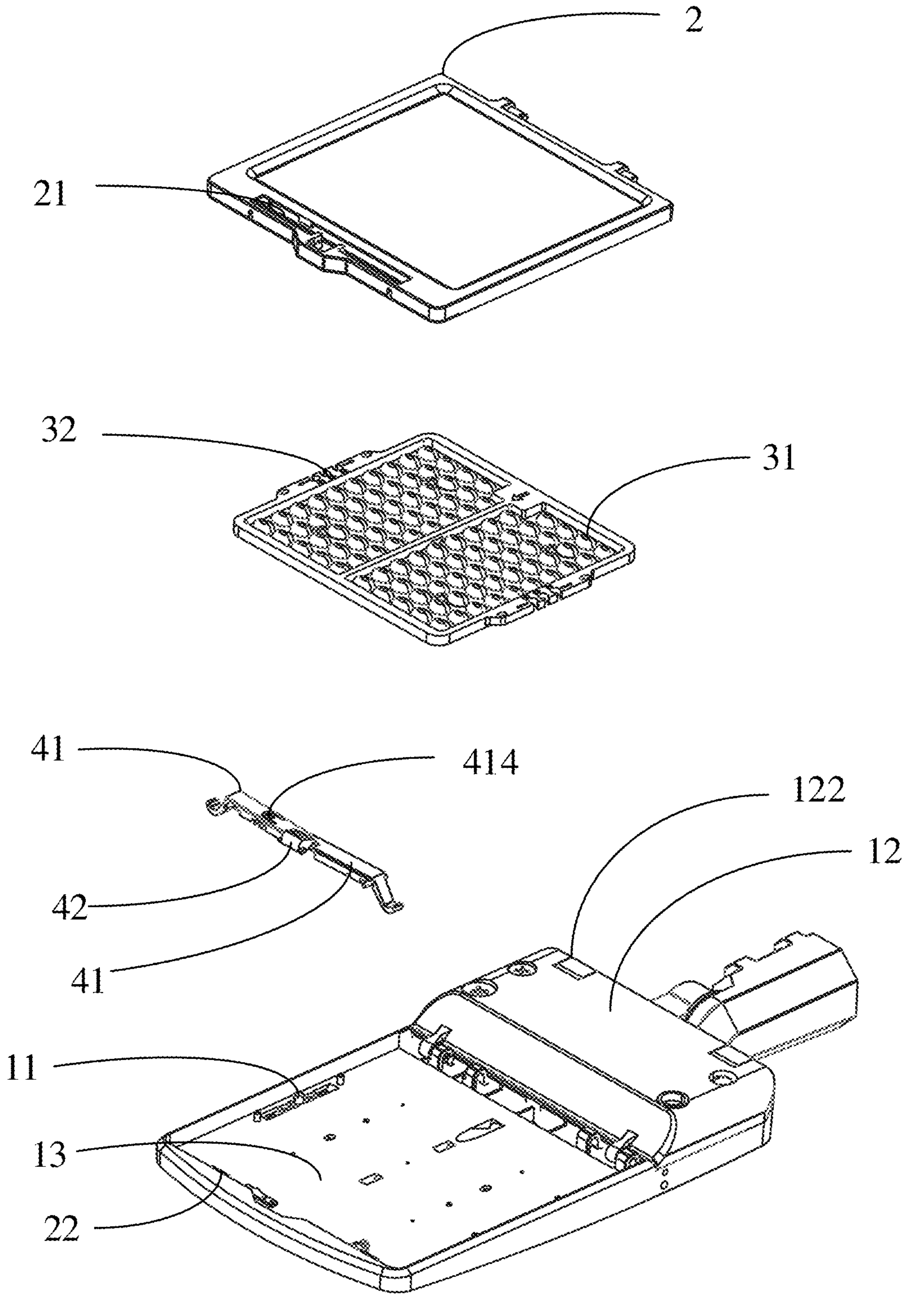
FIG. 2 is an exploded view of the shoe box lamp according to an embodiment of the present application.

Referring to FIG. 1 and FIG. 2, in an embodiment, one end of the first shell 1 is rotatably connected to one end of the second shell 2, and the other end of the first shell 1 is detachably connected to the other end of the second shell 2 through a locking structure 4. The first shell 1 is provided with a first body, and a first connection portion and a second connection portion provided at both ends of the first body. The second shell 2 is provided with a second body, and a third connection portion and a fourth connection portion provided at both ends of the second body. The first connection portion is rotatably connected to the third connection portion, and the second connection portion and the fourth connection portion are detachably connected to the second shell 2 through the locking structure 4. The hollow cylinder of the first connection portion is provided at the outer wall of the first body in a horizontal direction, and the third connection portion is provided a rotating block and a rotating shaft fixedly connected to one end of the rotating block. The first connection portion is cooperated and connected to the third connection portion, and the rotating shaft is inserted into the hollow cylinder to rotate in the hollow cylinder, thereby driving the second shell 2 to rotate at the first shell 1. Multiple groups of first connection portions matched with the third connection portions can be coaxially provided in the horizontal direction to increase the stability of the rotating structure. When disassembling, the second shell 2 can be disassembled for maintenance and replacement by withdrawing the rotating shaft from the hollow cylinder. In other embodiments, the first connection portion may be connected to the third connection portion through a rotating connection member such as a hinge to achieve the rotating connection between the first shell 1 and the third shell.

Figure 3:
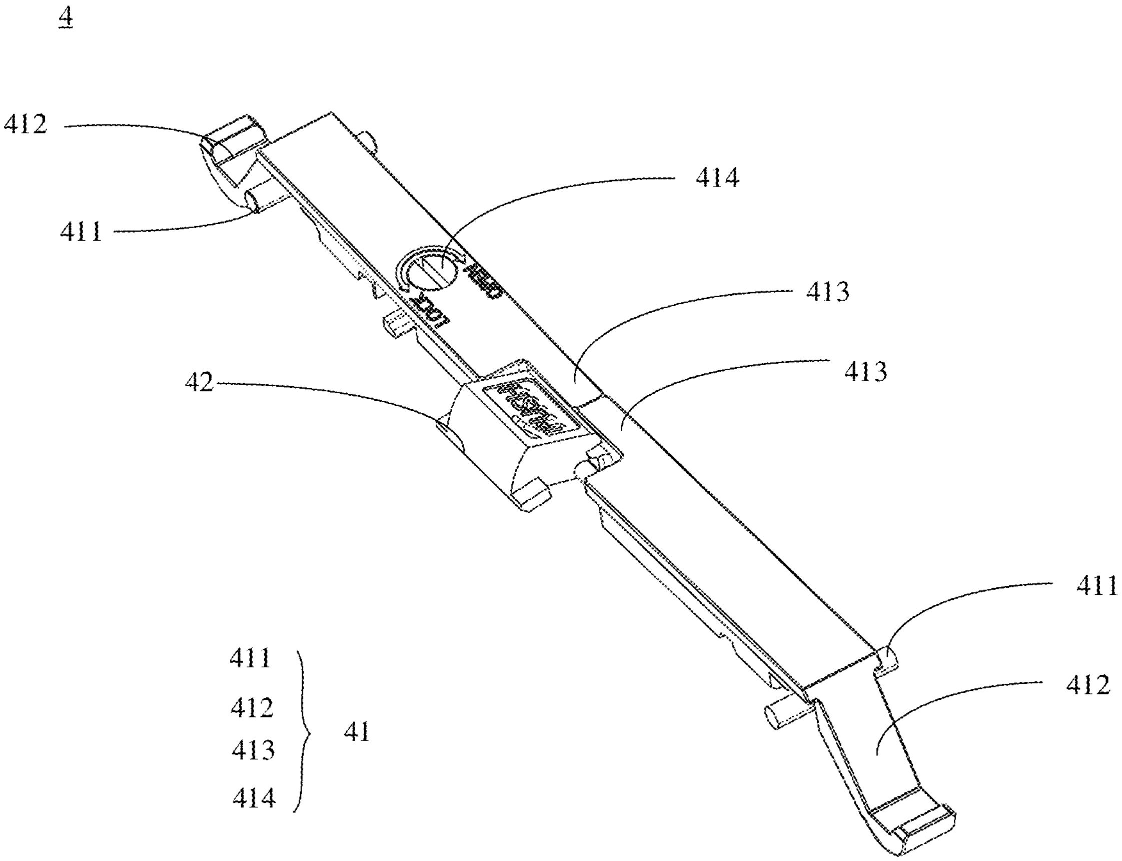
FIG. 3 is a schematic structural view of a locking structure of the shoe box lamp according to an embodiment of the present application.

Referring to FIG. 2 and FIG. 3, in an embodiment, the locking structure 4 includes a latch 41 and a buckle 42. The latch 41 is installed at the second shell 2, and the latch 41 is provided with a buckle position and a natural position. When the latch 41 is in the buckle position, the latch 41 can cover the second shell 2 at the first shell 1 and limit the first shell 1. When the latch 41 is in the natural position, the latch 41 releases the limit to the first shell 1, and the second shell 2 can be separated from the first shell 1. The buckle 42 is installed at the second shell 2, and the buckle 42 is provided with a lock position and an unlock position. When the buckle 42 is in the lock position, the buckle 42 can lock the latch 41 in the buckle position. When the buckle 42 is in the unlock position, the latch 41 can switch to the natural position.

In this embodiment, the latch 41 and the buckle 42 are used together to limit the first shell 1 and the second shell 2. The latch 41 is in the natural position when no external force is applied. At this time, the latch 41 is inclined at a certain angle to the second shell 2 under the action of the elastic member in its own structure. When the second shell 2 needs to cover the first shell 1, an external force is applied to the latch 41 to press the latch 41 downward, and the upper surface of the latch 41 is flush with the upper surface of the second shell 2. When the latch 41 is limited by the buckle 42, the second shell 2 can be limited to the first shell 1. At this time, the latch 41 can apply an external force towards the second shell 2 to the first shell 1 from the lower of the first shell 1, so as to combine the first shell 1 with the second shell 2. The buckle 42 is in the lock position when no external force is applied, so that the buckle 42 can continuously press the latch 41 when no external force is applied, thereby covering the second shell 2 with the first shell 1. When the second shell 2 needs to be disassembled, the external force is applied to the buckle 42 to switch the buckle 42 from the lock position to the unlock position. At this time, the latch 41 loses the limit of the buckle 42, pops from the original buckle position, and switches to the natural position, so that the first shell 1 loses the limiting effect of the latch 41, and can be separated from the second shell 2.

In an embodiment, the latch 41 is provided with a fixed shaft 411 and a connection end 412 and a locking end 413 provided at both sides of the fixed shaft 411. The fixed shaft 411 is rotatably connected to the second shell 2, the connection end 412 is configured to cooperate with the first shell 1, and the locking end 413 is configured to cooperate with the buckle 42. The second shell 2 is provided with a first through hole 21 at a position corresponding to the connection end 412, and the first shell 1 is provided with a second through hole 22 at a position corresponding to the first through hole 21. When the latch 41 is in the buckle position, the connection end 412 can simultaneously pass through the first through hole 21 and the second through hole 22 to abut against a side of the first shell 1 away from the second shell 2. The latch 41 is also provided with a first elastic member configured to drive the buckle 42 to switch from the buckle position to the natural position.

In this embodiment, the fixed shaft 411 is provided between the connection end 412 and the locking end 413 of the latch 41, so that the latch 41 forms a lever structure with the fixed shaft 411 as a fulcrum. The connection end 412 of the latch 41 is configured to cooperate with the first shell 1 to apply an external force towards the second shell 2 to the first shell 1, thereby limiting the first shell 1. The locking end 413 of the latch 41 is configured to cooperate with the buckle 42, so that the first shell 1 can be limited by the self-limiting property of the latch 41 and the buckle 42 without applying an external force. The first through hole 21 and the second through hole 22 are provided at the positions of the second shell 2 and the first shell 1 corresponding to the connection end 412. Since the latch 41 is installed at the side of the second shell 2 away from the first shell 1, the first through hole 21 and the second through hole 22 are provided so that the connection end 412 of the latch 41 passes through the first through hole 21 and the second through hole 22 to reach the side of the first shell 1 away from the second shell 2, so as to abut against the side of the first shell 1 away from the second shell 2, thereby applying pressure to the first shell 1 towards the second shell 2, thus the first shell 1 can continuously press the second shell 2.

In this embodiment, the elastic member provided at the latch 41 is a torsion spring provided around the outside of the fixed shaft 411, and elastic arms are provided at both ends of the torsion spring. The two elastic arms are provided at a certain angle, so that the latch 41 and the second shell 2 are stretched apart at a certain angle when in the natural position, so that the first shell 1 and the second shell 2 can be disassembled as needed. When the latch 41 is in the buckle position, the latch 41 and the second shell 2 work together to reduce the angle of the two elastic arms of the torsion spring, press the latch 41 to the buckle position, and limit the latch 41 through the buckle 42, so that the first shell 1 and the second shell 2 can be limited through the locking structure 4.

In an embodiment, the buckle 42 can be switched from the lock position to the unlock position under the action of an external force. The buckle 42 is provided with a second elastic member configured to switch the buckle 42 from the unlock position to the lock position. In this embodiment, the buckle 42 is kept in the lock position through the action of the second elastic member when not subjected to an external force, so that the locking structure 4 can lock the latch 41 when not subjected to an external force. When the second shell 2 needs to be opened, it is only necessary to apply an external force to the buckle 42 to press the buckle 42, and the buckle 42 is switched from the lock position to the unlock position, so that the latch 41 can be unlocked, thereby unlocking the first shell 1 and the second shell 2, thus the second shell 2 can be opened to adjust the lens 3.

In an embodiment, two latches 41 are provided opposite to each other, and the locking ends 413 of the two latches 41 are abutted against the buckle 42 at the same time. At least one latch 41 is provided with a locking member 414 configured to limit the latch 41 to the lock position. In this embodiment, two latches 41 are provided opposite to each other to increase the locking force of the first shell 1 and the second shell 2. Both the locking ends 413 of the two latches 41 are matched with the same the buckle 42. Only one the buckle 42 needs to be pressed to unlock the two latches 41, which simplifies the disassembly and assembly procedures, and improves the efficiency of replacing, adjusting and repairing the lens 3. The locking member 414 is configured to lock the latch 41. Since the latch 41 is in a pop-up state in a natural state, that is, when the latch 41 is not limited by the buckle 42, the latch 41 cannot lock the first shell 1 and the second shell 2. Therefore, when the buckle 42 is accidentally touched, the latch 41 will automatically pop, and the first shell 1 and the second shell 2 may lose their limiting function and separate automatically, thereby causing the lens 3 to fall and cause an accident. Therefore, the locking member 414 can be added to limit the latch 41 when the lens 3 does not need to be adjusted frequently, so that the latch 41 can still limit the first shell 1 and the second shell 2 when the buckle 42 loses the limiting function. In order to reduce material consumption, only one latch 41 needs to be provided with the locking member 414.

In an embodiment, the locking member 414 passes through the latch 41 and is rotatably connected to the second shell 2, and the locking member 414 unlocks the latch 41 by rotating. In this embodiment, the locking member 414 is formed by connecting two sections of cylinders of different diameters. The end with a larger diameter is a large diameter end, and the other end is a small diameter end. The latch 41 is provided with a mounting hole matched with the locking member 414, and the mounting hole is provided with a first hole section, a second hole section and a third hole section connected in sequence along the vertical height direction. The first hole section is provided at a side of the second hole section close to the first shell 1, and the third hole section is provided at a side of the second hole section close to the first shell 1. The diameter of the first hole section is larger than the diameter of the second hole section so that a first limit step is formed at a connection between the first hole section and the second hole section. The diameter of the second hole section is smaller than the diameter of the third hole section so that a second limit step is formed at a connection between the second hole section and the third hole section. The first hole section is configured to accommodate the large diameter end of the locking member 414, and the locking member 414 is limited to move towards the first shell 1 through the first limit step. The small diameter end is penetrated through the second hole section, and a limit block is provided at an outer wall of the small diameter end. When the locking member is rotated, the limit block can be driven to rotate in the third hole section.

It can be understood that the small diameter end of the locking member 414 is provided with the limit block, and an installation groove for installing the latch 41 is provided at one side of the second shell 2 away from the first shell 1. The installation groove is provided with a groove capable of accommodating the limit block. When the latch 41 needs to be locked by the locking member 414, the latch 41 is provided in the buckle position, and the limit block of the locking member 414 is rotated into the groove. The latch 41 is limited from popping out in the direction away from the first shell 1 through the limit of the groove to the limit block. At this time, even if the buckle 42 is not in the lock position and cannot lock the latch 41, the latch 41 can be limited in the buckle position through the locking member 414, so as to prevent the lens 3 from falling since the latch 41 is released and the second shell 2 is opened. A rotation groove is further provided at the side of the locking member 414 away from the first shell 1, and the rotation groove provides a force application point for the rotation of the locking member 414, so that the operator can drive the locking member 414 to rotate through the rotation groove.

In an embodiment, a positioning column 11 is provided at a side of the first shell 1 towards the second shell 2, and a plurality of positioning holes 32 are provided at intervals at the lens 3. Each of the positioning holes 32 corresponds to an installation position, and the positioning column 11 can be inserted into the positioning hole 32 to limit the lens 3 in the installation position. In this embodiment, in order to reduce the volume of the shoe box lamp 100, the interval distance between each installation position is small, and the distance is smaller than the diameter of the positioning hole 32. The positioning column 11 is detachably connected to the first shell 1, and a plurality of positioning grooves corresponding to the positioning hole 32 are provided at a side of the first shell 1 towards the second shell 2. Each group of positioning holes 32 and positioning grooves corresponds to an installation position. When the lens 3 is provided at the installation position, the positioning column 11 can pass through the positioning hole 32 corresponding to the installation position and be inserted into the corresponding positioning groove. In other embodiments, if the interval between each installation position is relatively large, the positioning column 11 can be fixedly provided at the first shell 1. The lens 3 can be limited to the corresponding installation position by sleeve-fitting different installation holes at the positioning column 11 in the same position.

Referring to FIG. 2, in an embodiment, the lens 3 includes a plurality of light-emitting covers 31 provided in a matrix, and the plurality of light-emitting covers 31 are provided in groups. Each group of light-emitting covers 31 has a different refraction angle, and the light source presents different light emitting effects through the light-emitting cover 31 to transmit different light spots. The plurality of different light-emitting covers 31 are combined under the light source, so that the light source can emit different light types through different groups of light-emitting covers 31, and the operator only needs to move the lens 3 to different installation positions to adjust the light type emitted by the shoe box lamp 100 as needed.

Figure 4:
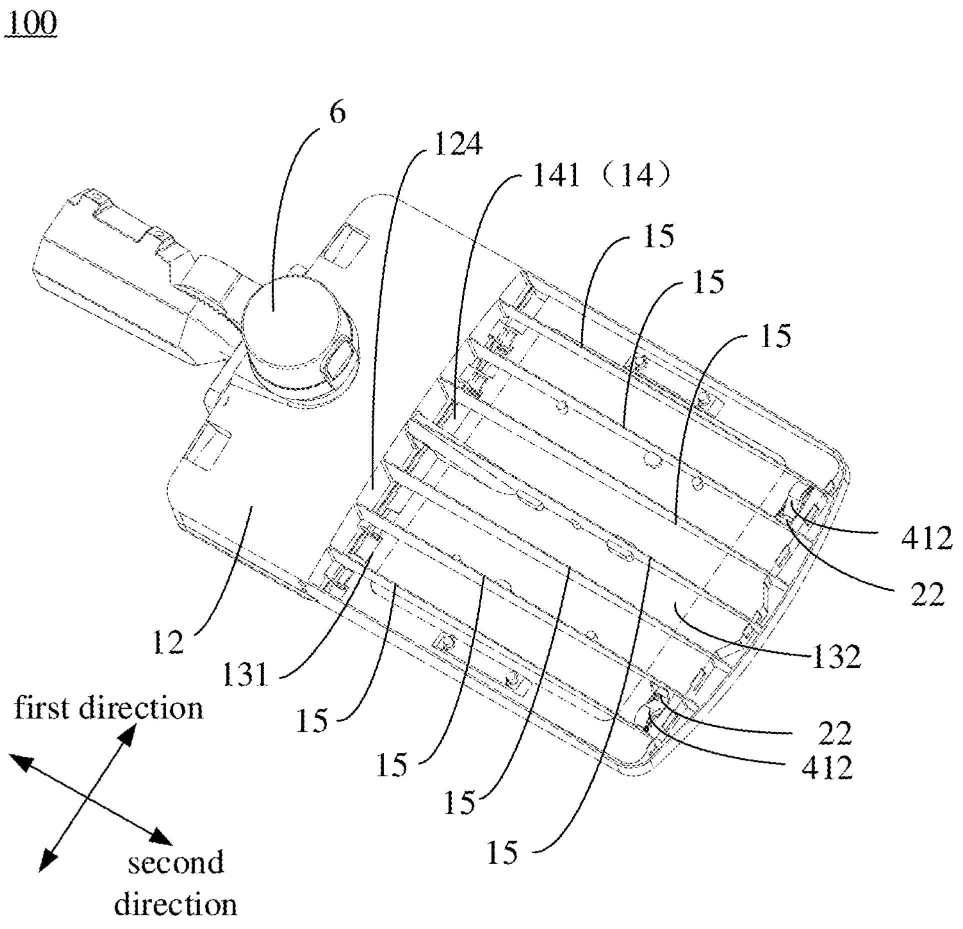
FIG. 4 is a schematic structural view of the shoe box lamp according to an embodiment of the present application.

Referring to FIG. 4, in an embodiment, the shoe box lamp 100 further includes a power member 7. The first shell 1 is provided with a power compartment 12 and a lamp box 13 provided at intervals, the light source and the lens 3 are installed in the lamp box 13, and the power member 7 is installed in the power compartment 12. The power compartment 12 is connected to the lamp box 13 through a connection portion 14, the connection portion 14 is provided with a heat isolation groove 141, and the outer wall of the lamp box 13 is provided with a heat dissipate piece 15.

In this embodiment, the first shell 1 is integrated or combined, and the interior of the first shell 1 is separated by its own structure to form the power compartment 12 and the lamp box 13. The power compartment 12 and the lamp box 13 are spatially isolated from each other to reduce mutual interference and reduce heat transfer between each other. The power compartment 12 and the lamp box 13 are physically connected and supported by the connection portion 14. The connection portion 14 can effectively block or significantly weaken the heat conduction path between the power compartment 12 and the lamp box 13, thereby improving the thermal management performance of the entire lamp. A heat isolation groove 141 is opened at the connection portion 14. The heat isolation groove 141 can be a continuous long groove, an intermittent short groove array, or a specific hollow structure. The function is to increase the length and thermal resistance of the heat conduction path and achieve thermal isolation between the two regions. In this embodiment, the connection portion 14 extends along the first direction, and a plurality of heat isolation grooves 141 are provided at intervals along the first direction, so that the connection portion 14 has strong stability and heat dissipation. Since the light source will also generate a lot of heat when it is powered on, in order to enhance the heat dissipation capacity of the lamp box 13, at least one outer wall surface of the lamp box 13 is provided with a plurality of heat dissipate pieces 15. The heat dissipate piece 15 extends perpendicular to the wall surface, which can increase the contact surface area between the lamp box 13 and the surrounding air, thereby promoting the rapid dissipation of heat through convection and radiation. The light source is a circuit board integrated with an LED light source. The light source is fixedly installed between the bottom of the lamp box 13 and the lens 3, and the power member 7 is fixedly installed in the power compartment 12.

Figure 7:
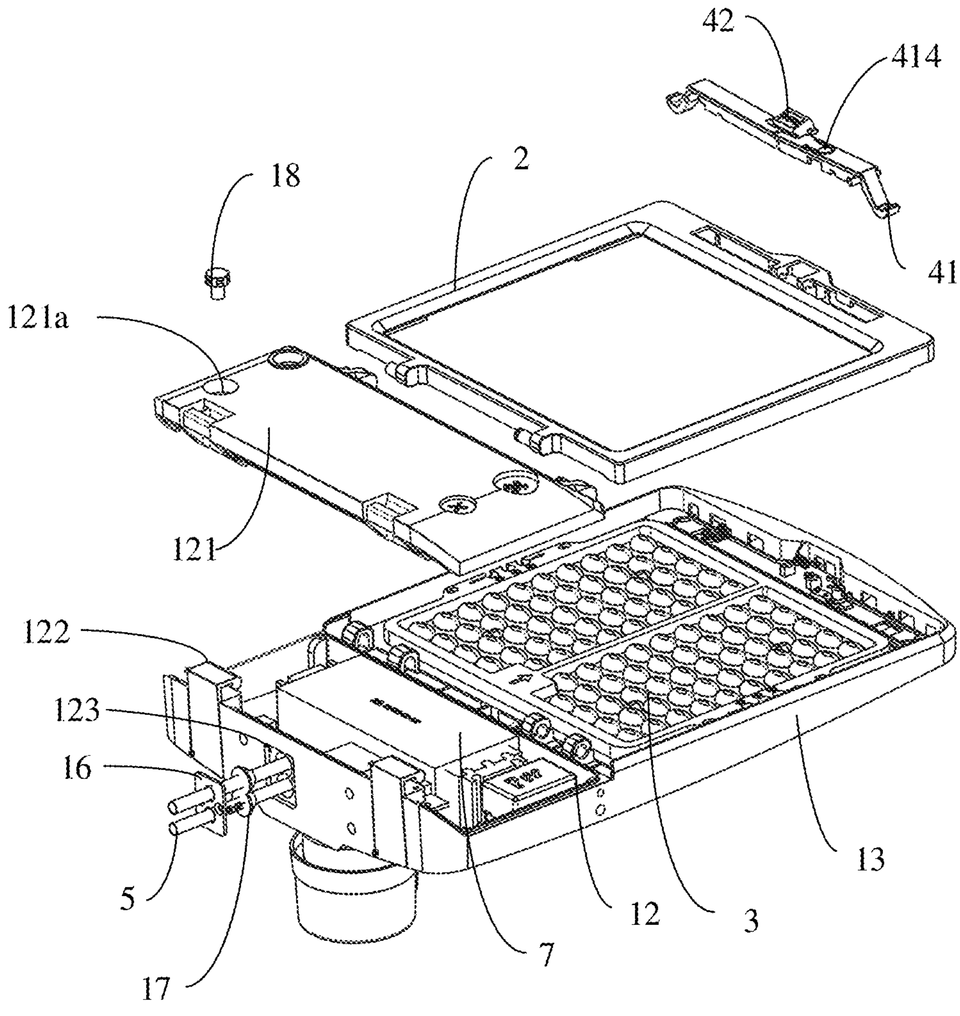
FIG. 7 is a schematic exploded structural view of FIG. 6.

Referring to FIG. 4 and FIG. 7, in an embodiment, the power compartment 12 is provided with an installation cavity open towards one side and a cover body 121 configured for covering the opening of the installation cavity, and the power member 7 is installed in the installation cavity. One end of the cover body 121 is rotatably connected to the power compartment 12, and the other end of the cover body 121 is provided with a press buckle 122. The outer wall of the power compartment 12 is provided with a limit portion cooperated with the press buckle 122, and the cover body 121 is detachably connected to the power compartment 12 through the press buckle 122 and the limit portion. After the limit portion is aligned, the cover body 121 of the power compartment 12 can be limited by snapping the press buckle 122 at the limit portion. When the power member 7 needs to be replaced, the cover body 121 can be quickly opened to replace the power member 7 by only disassembling the press buckle 122 without damaging the shell.

Figure 6:
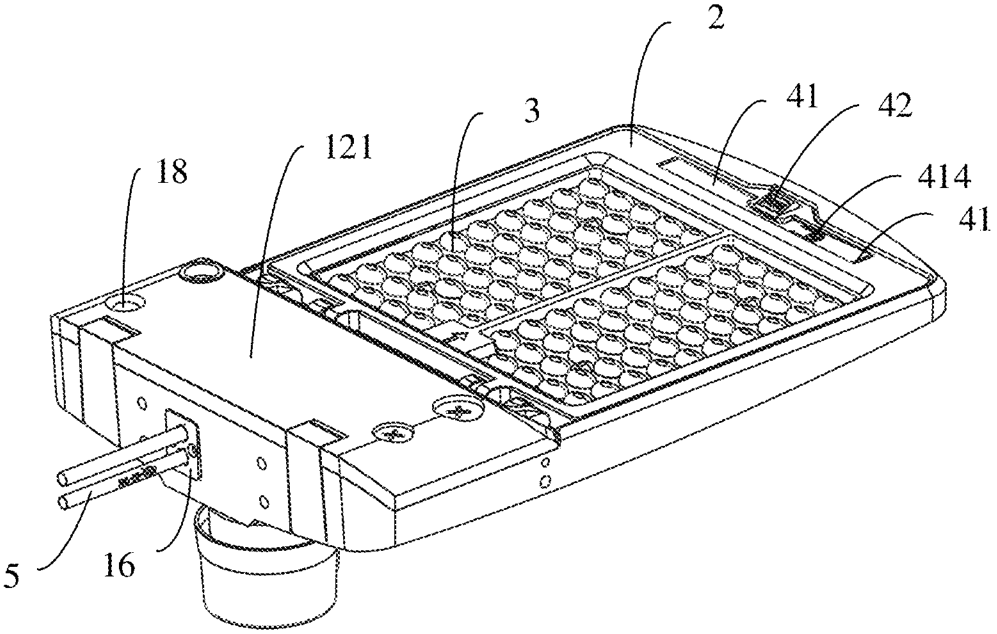
FIG. 6 is a schematic structural view of the shoe box lamp according to an embodiment of the present application.

Referring to FIG. 6 and FIG. 7, in an embodiment, the sidewall of the power compartment 12 is provided with a wire groove 123. The wire groove 123 is provided with an opening opened outward, and a bottom wall of the wire groove 123 is opposite to the opening. The groove bottom wall is provided with a through hole for the wire 5 to pass through, and the first shell 1 further includes a cover plate 16 and a waterproof member 17. The waterproof member 17 is sleeved at the outer wall of the wire 5 and is abutted against the inner wall of the through hole, the cover plate 16 is provided with an avoidance hole for the wire 5 to pass through, and the cover plate 16 is covered at the opening. The through hole is configured for the wire 5 to pass through, so that the wire 5 communicated with the power member 7 can pass through the power compartment 12, thereby connecting to external parts. The waterproof member 17 is elastic silicone, and the waterproof member 17 is elastically abutted between the inner wall of the through hole and the outer wall of the wire 5, so as to seal and fill the gap between the inner wall of the through hole and the outer wall of the wire 5. The outer contour of the waterproof member 17 is in a cone shape, and the end of the through hole close to the end cover is in a shape that matches the outer contour of the waterproof member 17, so as to facilitate the installation of the waterproof member 17. When the elastic force of the waterproof member 17 weakens during use, the waterproof member 17 can be pushed into the through hole for a certain distance to press the waterproof member 17 more tightly, thereby extending the service life of the waterproof member 17.

Figure 5:
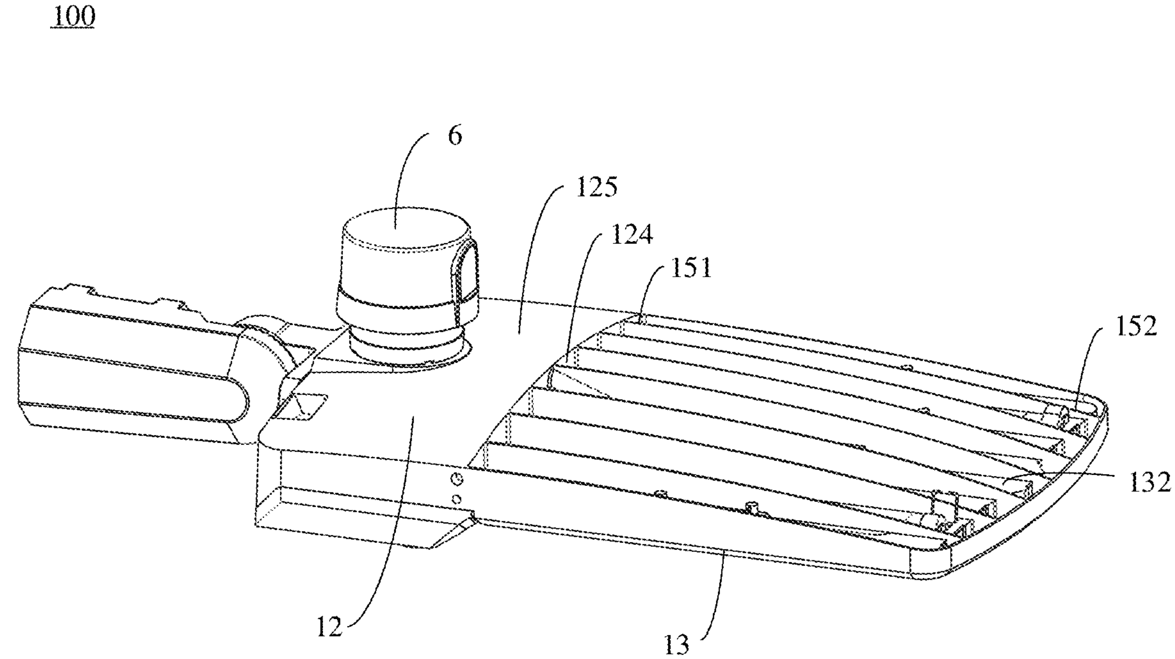
FIG. 5 is a schematic structural view of the shoe box lamp according to an embodiment of the present application.

Referring to FIG. 4 and FIG. 5, in an embodiment, one side of the power compartment 12 close to the lamp box 13 is provided with a first sidewall 124, and one side of the lamp box 13 close to the power compartment 12 is provided with a second sidewall 131. One end of the connection portion 14 is connected to the first sidewall 124, and the other end of the connection portion 14 is connected to the second sidewall 131. A plurality of heat dissipate pieces 15 are provided at intervals along the first direction, and each of the heat dissipate pieces 15 extends along the second direction. The heat dissipate piece 15 is provided with a first end 151 connected to the first sidewall 124 and a second end 152, and the height of the top of the heat dissipate piece 15 tends to decrease from the first end 151 towards the second end 152.

In this embodiment, the power compartment 12 is adjacent to the lamp box 13 in space, and the side of the power compartment 12 close to the lamp box 13 is the first sidewall 124. Correspondingly, the side of the lamp box 13 close to the power compartment 12 is the second sidewall 131. The connection portion 14 is provided between the first sidewall 124 and the second sidewall 131. One end of the connection portion 14 is fixed at the first sidewall 124, and the other end of the connection portion 14 is fixed at the second sidewall 131, so that the power compartment 12 and the lamp box 13 are integrated into a stable whole. At the same time, the lamp box 13 and the power compartment 12 can be separated to avoid heat transfer between the power compartment 12 and the lamp box 13. A plurality of heat dissipate pieces 15 are provided along the first direction, and each of the heat dissipate pieces 15 extends along the second direction and is perpendicular to the second top wall 132 of the lamp box 13, which can increase the contact area between the lamp box 13 and the air, thereby increasing the heat dissipation efficiency and heat dissipation of the lamp box 13, preventing the lamp box 13 and the lamp board from being overheated during operation, and avoiding damage to circuit components. The height of the top of the heat dissipate piece 15 tends to decrease from the first end 151 toward the second end 152, so that a continuous, inclined heat dissipation surface is formed at the top of each heat dissipate piece 15, which is conducive to heat conduction and convection heat dissipation, and provides a guiding path for condensed water, dust, etc.

In an embodiment, the power compartment 12 is provided with a first top wall 125, and the lamp box 13 is provided with a second top wall 132. The first top wall 125 is higher than the second top wall 132, and the heat dissipate piece 15 is provided at the second top wall 132. The top of the first top wall 125 is set higher than the top of the second top wall 132, so that the power supply with greater heat can be provided at a higher position than the lamp panel, and the heat at the high position will flow to the low position. When flowing downward, the heat will flow out through the heat dissipation hole between the power compartment 12 and the lamp box 13, thereby isolating the heat between the lamp box 13 and the power compartment 12, avoiding heat transfer between the power compartment 12 and the lamp box 13, and preventing low heat dissipation efficiency.

In an embodiment, the power compartment 12 is provided with an opening opened towards a side away from the first top wall 125, and the first shell 1 also includes a cover body 121 covering the opening. The cover body 121 is opened with a balance hole 121*a*, and the fluid in the power compartment 12 flows out through the balance hole 121*a*. The balance hole 121*a* is configured to balance the temperature inside and outside the power compartment 12. When the battery is working, the battery assembly will generate heat during power supply. The heat will easily form water mist when it encounters a cold source. The balance hole 121*a* can enable the high-temperature gas inside the power compartment 12 to be discharged, thereby avoiding the formation of excessive condensation water in the power compartment 12, which otherwise will cause the battery assembly to be damaged by moisture.

In an embodiment, the first shell 1 further includes a one-way joint 18 provided at the balance hole 121*a*, and the one-way joint 18 is configured to limit the fluid flowing out of the power compartment 12 in one direction. The one-way joint 18 is provided in the balance hole 121*a*, and the one-way joint 18 includes a body, a slide member and an elastic member. The body extends along the axial direction and is opened with a through hole, and the through hole is provided with a first hole section, a second hole section and a third hole section in sequence along the axial direction and communicated with each other. The first hole section is provided at one end of the second hole section close to the inside of the power compartment 12, and the third hole section is provided at one end of the second hole section close to the outside of the power compartment 12. The slide member is slidably provided in the second hole section, and the elastic member is provided at one side of the slide member close to the third hole section. The inner diameter of the first hole section is smaller than the inner diameter of the second hole section, so that a first limit step is formed between the first hole section and the second hole section. The first limit step is configured to limit the position of the slide member so that the slide member is limited in the second hole section. The inner diameter of the third hole section is smaller than the inner diameter of the second hole section so that a second limit step is formed between the third hole section and the second hole section. The elastic member is elastically abutted between the slide member and the second limit step. The elastic member is configured to apply external force to the slide member so as to push the slide member to slide towards the first limit step and abut the slide member against the first limit step. At this time, the end of the first hole section close to the second hole section can be sealed by the slide member.

It can be understood that when a large amount of heat is generated inside the power compartment 12 due to the operation of the battery, the gas expands due to the heat, and the slide member moves towards the third hole section against the elastic force of the elastic member under the action of the atmospheric pressure. At this time, the end of the first hole section close to the second hole section is opened, and the hot air flow in the power compartment 12 is discharged from the through hole to the outside of the power compartment 12 until the temperature inside the power compartment 12 reaches the same equilibrium as the temperature outside, and the air flow no longer flows. At this time, the slide member moves towards the first hole section under the action of the elastic member, and is abutted against the first limit step again, so that the end of the first hole section close to the second hole section is resealed. When the temperature outside the power compartment 12 is higher than the temperature inside the power compartment 12, the slide member is cooperated with the first limit step to seal the first hole section, and the hot air flow outside cannot enter the power compartment 12 from the through hole, so that heat exchange will not be generated in the power compartment 12 to form water mist. The water flow is similar to the air flow, both of which are unidirectional flows at the through hole of the one-way joint 18, and cannot enter the power compartment 12 from the outside of the power compartment 12. In this way, the fluid in the one-way joint 18 can only flow from the inside of the power compartment 12 to the outside of the power compartment 12, but cannot flow from the outside of the power compartment 12 to the inside of the power compartment 12, thereby preventing the battery components in the power compartment 12 from being damaged by condensed water due to gas heat exchange. While ensuring the heat dissipation of the power compartment 12, the internal battery can be protected from damage by condensed water.

In an embodiment, the shoe box lamp 100 further includes a sensor 6 configured to sense environmental changes, so that the shoe box lamp 100 can change brightness according to environmental changes. The sensor 6 is an infrared sensing device that can sense whether there are people passing by, so that the shoe box lamp 100 can illuminate the surrounding environment as needed when people pass by a road section with low brightness.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A shoe box lamp, comprising:

a first shell provided with a plurality of installation positions;

a second shell detachably connected to one side of the first shell;

a light source fixedly installed between the first shell and the second shell; and a lens provided on one side of the light source close to the second shell;

wherein the lens is configured to be adjusted between the plurality of installation positions; and when the lens is in different installation positions, light from the light source is configured to emit different light spots through the lens.

2. The shoe box lamp according to claim 1, further comprising a locking structure, wherein one end of the first shell is rotatably connected to one end of the second shell; and the other end of the first shell is detachably connected to the other end of the second shell through the locking structure.

3. The shoe box lamp according to claim 2, wherein the locking structure comprises:

a latch installed at the second shell and provided with a buckle position and a natural position; and a buckle installed at the second shell and provided with a lock position and an unlock position;

wherein when in the buckle position, the latch is configured to cover the second shell at the first shell and limit the first shell; and when in the natural position, the latch is configured to release the limit to the first shell so that the second shell is separated from the first shell; and when in the lock position, the buckle is configured to lock the latch in the buckle position; and when in the unlock position, the latch is configured to switch to the natural position.

4. The shoe box lamp according to claim 3, wherein the latch is provided with a fixed shaft, a connection end and a locking end are provided at both sides of the fixed shaft, and the fixed shaft is rotatably connected to the second shell;

the connection end is cooperated with and connected to the first shell, and the locking end is cooperated with and connected to the buckle;

a first through hole is provided at a position of the second shell corresponding to the connection end, and a second through hole is provided at a position of the first shell corresponding to the first through hole;

when the latch is in the buckle position, the connection end is configured to simultaneously pass through the first through hole and the second through hole and abut against one side of the first shell away from the second shell; and the latch is further provided with a first elastic member configured to drive the buckle to switch from the buckle position to the natural position.

5. The shoe box lamp according to claim 3, wherein the buckle is configured to switch from the lock position to the unlock position under an action of an external force, and the buckle is provided with a second elastic member configured to switch the buckle from the unlock position to the lock position.

6. The shoe box lamp according to claim 4, wherein two latches are provided opposite to each other, locking ends of the two latches are abutted against the buckle at the same time, and at least one of the two latches is provided with a locking member configured to limit the latch to the lock position.

7. The shoe box lamp according to claim 6, wherein the locking member is configured to pass through the latch and is rotatably connected to the second shell, and the locking member is configured to unlock the latch by rotating.

8. The shoe box lamp according to claim 1, wherein a positioning column is provided at one side of the first shell facing the second shell, a plurality of positioning holes are provided at intervals at the lens, each of the positioning holes corresponds to one of the installation positions, and the positioning column is configured to be inserted into the positioning hole to limit the lens to one of the installation positions.

9. The shoe box lamp according to claim 1, wherein the lens comprises a plurality of light-emitting covers provided in a matrix and in groups, each group of the light-emitting covers is provided with a different refraction angle, and the light source is configured to present different light emitting effects through the light-emitting covers to transmit different light spots.

10. The shoe box lamp according to claim 1, further comprising a power member, wherein the first shell comprises a power compartment and a lamp box provided at intervals, the light source and the lens are installed in the lamp box, and the power member is installed in the power compartment; and the power compartment is connected to the lamp box through a connection portion, the connection portion is provided with a heat isolation groove, and an outer wall of the lamp box is provided with a heat dissipate piece.

11. The shoe box lamp according to claim 10, wherein the power compartment is provided with an installation cavity opened towards one side and a cover body configured for covering an opening of the installation cavity, and the power member is installed in the installation cavity;

one end of the cover body is rotatably connected to the power compartment, and the other end of the cover body is provided with a press buckle; and an outer wall of the power compartment is provided with a limit portion cooperated with the press buckle, and the cover body is detachably connected to the power compartment through the press buckle and the limit portion.

12. The shoe box lamp according to claim 10, wherein a sidewall of the power compartment is provided with a wire groove, the wire groove is provided with an opening opened outward and a groove bottom wall opposite to the opening, and the groove bottom wall is provided with a through hole for a wire to pass through; and the first shell further comprises a cover plate and a waterproof member, the waterproof member is sleeved at an outer wall of the wire and is abutted against an inner wall of the through hole, the cover plate is provided with an avoidance hole for the wire to pass through, and the cover plate is provided to cover the opening.

13. The shoe box lamp according to claim 10, wherein one side of the power compartment close to the lamp box is provided with a first sidewall, and one side of the lamp box close to the power compartment is provided with a second sidewall;

one end of the connection portion is connected to the first sidewall, and the other end of the connection portion is connected to the second sidewall;

a plurality of heat dissipate pieces are at intervals along the first direction, each of the heat dissipate pieces is configured to extend along the second direction, and the heat dissipate piece is provided with a first end and a second end; and the first end is connected to the first sidewall, and a height of a top of the heat dissipate piece is configured to decrease from the first end towards the second end.

14. The shoe box lamp according to claim 10, wherein the power compartment is provided with a first top wall, and the lamp box is provided with a second top wall; and the first top wall is higher than the second top wall, and the heat dissipate piece is provided at the second top wall.

15. The shoe box lamp according to claim 14, wherein the power compartment is provided with an opening opened towards a side away from the first top wall; and the first shell further comprises a cover body covering the opening, the cover body is provided with a balance hole, and fluid in the power compartment is configured to flow out through the balance hole.

16. The shoe box lamp according to claim 15, wherein the first shell further comprises a one-way joint provided at the balance hole, and the one-way joint is configured to limit the fluid flowing out of the power compartment in one direction.

17. The shoe box lamp according to claim 1, further comprising a sensor configured to sense environmental changes so that the shoe box lamp is configured to change a brightness according to environmental changes.

* * * * *